July 23, 1929.   J. F. STONE   1,722,065
ANTISKID DEVICE
Filed April 14, 1926

Inventor
JULIUS F. STONE his Attorneys

Patented July 23, 1929.

1,722,065

UNITED STATES PATENT OFFICE.

JULIUS F. STONE, OF COLUMBUS, OHIO.

ANTISKID DEVICE.

Application filed April 14, 1926. Serial No. 102,059.

In anti-skid chains for tired wheels the terminal hook of the cross chain often becomes tightly stuck in the corner between the link of the side chain with which said terminal hook is connected and an adjacent link of the side chain. When so caught such hook is in an abnormal or twisted position thus interfering with the proper working of the cross chain and causing undue wear and fracture of the terminal hook as well as wearing out the link of the side chain. When a terminal hook thus becomes caught it tends to remain so. That such terminal hooks become so caught is due to the fact that the hook as commonly constructed has its eyes so close together that it can slide around the curve of the wire at the end of the side chain link. In carrying out my invention I therefore provide a form of terminal hook to insure and maintain an adequate spacing of such eyes to prevent the objectionable result referred to.

The invention is embodied in the example herein shown and described, the features of novelty being finally claimed.

In the accompanying drawing—

Figure 1:
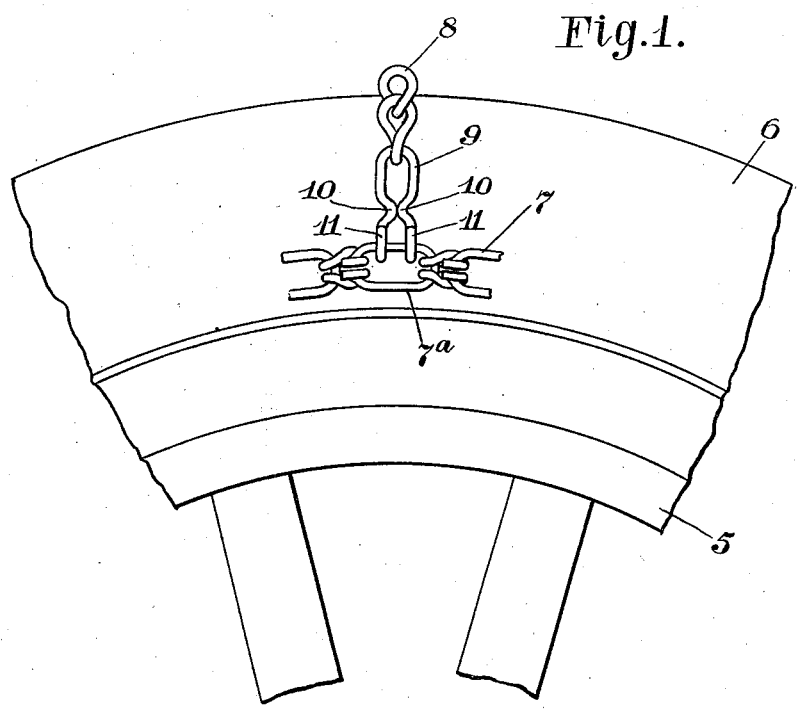
Figure 1 is a side view of a fraction of wheel, tire and skid chain showing my invention embodied therein.
Figure 2:
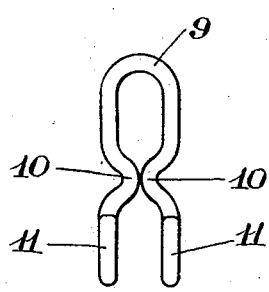
Fig. 2 is a plan view of the terminal hook on a larger scale.
Figure 3:
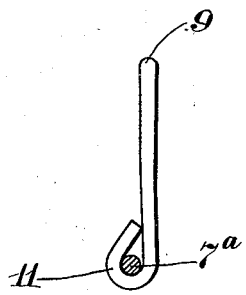
Fig. 3 is a side view of the same showing the eyes of the terminal hook bent around the bar of the side chain link, said bar being in section.

In the views 5 designates the fraction of the wheel rim and 6 the rubber tire thereon. 7 designates a fraction of an ordinary side chain; 8 a cross chain and 9 the terminal hook connecting the cross chain at one of its ends with a link 7ª of the side chain.

The said terminal hook 9 according to my invention has each of the two ordinary parallel legs thereof formed with lateral bends 10 extending toward each other so that by contact with each other they are adapted to limit the approach of said legs toward each other and consequently the approach of the eye portions 11 of said legs toward each other. These lateral bends 10 are made of such depth that the minimum spread of the eyes 11 from each other permitted by the contact of the bends with each other is ample to prevent the terminal hook 9 from sliding around the end of the side chain or into position to be caught in the corner thereof. The bends therefore constitute stops for maintaining such ample spacing of the eyes 11, or substantially such, as shown, as to preclude the sliding of the terminal hook to such a position that it can, in normal circumstances, enter or remain in the corner between the links of the side chain and result in the troubles herein first set forth.

The forms of the parts can be somewhat changed without departing from the gist of the invention as claimed.

What I claim is:

1. A terminal hook for engaging the cross chains of an anti-skid device with one of the long bars of an elongated link in a side chain, said hook consisting of a piece of wire bent to form substantially parallel legs, having substantially parallel terminal eye portions to hook onto the link bar aforesaid, said eye portions spaced sufficiently from each other to preclude the sliding of the hook around the end of such side chain link, one of said legs having a portion bent toward the other to prevent the approach of its terminal eye portion toward the terminal eye portion of the other leg.

2. A terminal hook for engaging the cross chains of an anti-skid device with one of the long bars of an elongated link in a side chain, said hook consisting of a piece of wire bent to form substantially parallel legs, having substantially parallel terminal eye portions to hook onto the link bar aforesaid, said eye portions spaced sufficiently from each other to preclude the sliding of the hook around the end of such side chain link each of said legs having a portion bent toward the other to prevent the approach of its eye portion toward the eye portion of the other leg.

JULIUS F. STONE.